(12) United States Patent
Culbreth

(10) Patent No.: US 11,572,848 B1
(45) Date of Patent: Feb. 7, 2023

(54) MULTI-PORT POWER ENGINE

(71) Applicant: Edric Darrell Culbreth, Raleigh, NC (US)

(72) Inventor: Edric Darrell Culbreth, Raleigh, NC (US)

(*) Notice: Subject to any disclaimer, the term of this patent is extended or adjusted under 35 U.S.C. 154(b) by 0 days.

(21) Appl. No.: 17/518,593

(22) Filed: Nov. 4, 2021

(51) Int. Cl.
 *F02F 3/24* (2006.01)
 *F02F 3/28* (2006.01)

(52) U.S. Cl.
 CPC . *F02F 3/24* (2013.01); *F02F 3/28* (2013.01)

(58) Field of Classification Search
 CPC ...................................... F02F 3/24; F02F 3/28
 See application file for complete search history.

(56) References Cited

U.S. PATENT DOCUMENTS

| | | | | |
|---|---|---|---|---|
| 2,738,782 A * | 3/1956 | Bodine, Jr. | ............ | F02B 23/08 123/193.6 |
| 3,057,334 A * | 10/1962 | Bailey | ................ | F02B 23/0696 123/269 |
| 4,092,967 A * | 6/1978 | Haslett | ................ | F02B 23/0603 123/193.6 |
| 4,572,123 A * | 2/1986 | Evans | ..................... | F02B 23/08 123/262 |
| 4,898,135 A * | 2/1990 | Failla | ...................... | F02B 23/00 123/193.6 |
| 5,322,042 A * | 6/1994 | di Priolo | ................. | F02B 19/16 123/193.6 |
| 6,019,080 A * | 2/2000 | LaGrone | .................. | F02F 3/00 123/193.6 |
| 6,951,211 B2 | 10/2005 | Bryant | | |
| 9,316,178 B2 | 4/2016 | Hagen | | |
| 9,803,537 B2 | 10/2017 | Morgan | | |
| 9,909,489 B1 * | 3/2018 | Koci | .................... | F02B 23/0648 |
| 10,989,109 B2 * | 4/2021 | Warren | ...................... | F02F 3/28 |
| 2010/0012106 A1 * | 1/2010 | Ishida | ..................... | F02B 25/22 123/73 R |
| 2015/0260081 A1 * | 9/2015 | Morgan | .................. | F02B 23/08 123/193.6 |
| 2017/0145899 A1 * | 5/2017 | Singh | .................. | F02B 23/0651 |
| 2018/0094569 A1 * | 4/2018 | Svensson | .................. | F02F 3/24 |
| 2019/0093598 A1 * | 3/2019 | Singh | ...................... | F02B 23/06 |

* cited by examiner

*Primary Examiner* — Kurt Philip Liethen
(74) *Attorney, Agent, or Firm* — Gregory M. MacDonald

(57) ABSTRACT

The present invention allows the air-fuel mixture to swirl in a combustion chamber to increase the power from the engine. Each engine cylinder contains a piston, a combustion chamber, and at least one intake valve, exhaust valve, and spark-plug. Also, the top of the piston head contains a hole that forms the entry point of a converging nozzle, where the air-fuel mixture is first directed downwards and then horizontally through intake nozzles onto ramps located on the inner walls of the combustion chamber that allows the air-fuel mixture to swirl in a counter-clock wise motion. This swirling effect causes a cyclone inside the combustion chamber that when ignited it results in an additional explosive force that drives the piston downwards with additional acceleration, which increase the power produced by the engine.

7 Claims, 8 Drawing Sheets

MULTI-PORT POWER ENGINE

CROSS-REFERENCE TO RELATED APPLICATION

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR

Not Applicable

BACKGROUND

Unless otherwise indicated herein, the materials described in this section are not prior art to the claims in this application and are not admitted to be prior art by inclusion in this section.

1. Field of the Invention

The present invention relates generally to engines. More specifically, the present invention relates to internal combustion engines.

2. Description of Related Art

Internal combustion engines are comprised of a number of engine cylinders. Each cylinder contains a piston in the bottom and a combustion chamber in the top. The combustion chamber comprises at least one intake valve, at least one exhaust valve, and at least one spark-plug. The valves open and close using rocker arms and springs. When the intake valve opens, it allows an air-fuel mixture into the combustion chamber, where the spark-plug ignites the air-fuel mixture causing an explosion, which drives the piston downwards. The piston is connected to a connecting rod, which is connected to a crank shaft that converts the vertical motion into rotary motion to drive the wheels of the vehicle through various machinery. The exhaust from the explosion is emitted through the exhaust valve.

A typical engine has a cross-flow head design where the intake valves and the exhaust valves are positioned directly opposite each other on top of the piston head. Traditionally, combustion chambers have one exhaust valve and one intake valve. Modern engines may have four valves per cylinder with two intake valves and two exhaust valves. Four valves per cylinder allows more power than two valves per cylinder. In the past, more powerful engines were created by making them larger in size. However, this creates a problem when space limitations are an issue. For example, the more air-fuel that can be introduced into the combustion chamber, the more power that the engine can produce. However, this requires reducing the diameter of the valves in the cylinder head to increase the number of valves due to dimensional constraints. Thus, there is a need to increase the power from an internal combustion engine given the dimensional restraints of the combustion chamber.

Traditionally, engines operate by pulling a vacuum, compressing a fuel-air mixture, and detonating this mixture. However, this often results in poor fuel atomization, where the engine does not run well, since the mixture entering the cylinders varies on each bore and cycle. This may create an unstable idle, tip-in hesitation, and a general lack of performance, along with a higher rate of fuel consumption. Thus, there is a need to improve the fuel atomization, while creating a stable idle without tip-in hesitation, better performance, and a lower rate of fuel consumption.

Gasoline engines have a limit on the maximum pressure during the compression stroke, after which the fuel/air mixture detonates rather than burns. To achieve higher power outputs at the same speed, more fuel must be burned and therefore more air is needed. To achieve this, turbochargers or superchargers are used to increase the inlet pressure. This would result in detonation of the fuel/air mixture unless the compression ratio was decreased, i.e. the volume above the piston made greater. This can be done to a greater or lesser extent with massive increases in power being possible. The down side of this is that under light loading, the engine can lack power and torque. Thus, there is a need for an engine that can provide sufficient power and torque under light loading.

Exhaust gas recirculation (EGR) works by recirculating a portion of an engine's exhaust gas back to the engine cylinders. A faulty EGR valve can cause problems with the flow and operation of the EGR system leading to performance issues including a reduction in power, reduced acceleration and decreased fuel efficiency. It can also cause vehicle emissions to increase. EGR valves can become stuck 'open' or 'closed' due to a build-up of soot particles, carbon deposits and dirt from fuel. Thus, there is a need for an engine that avoids the build-up of soot particles, carbon deposits and dirt from fuel.

Therefore, there is a need for an engine that (1) has increased power without expanding the dimensional restraints of the combustion chamber; (2) improves fuel atomization, while creating a stable idle without tip-in hesitation, better performance, and a lower rate of fuel consumption; (3) provides sufficient power and torque under light loading; and (4) avoids build-up of soot particles, carbon deposits and dirt from fuel. The present invention solves one or more of these problems.

BRIEF SUMMARY OF THE INVENTION

It is a principal object to solve at least one of the disadvantages with other attempted solutions or to create other utility by either (1) overcoming the dimensional constraints of the combustion chamber to increase the power that can be obtained from an engine; (2) improving fuel atomization, while creating a stable idle without tip-in hesitation, better performance, and a lower rate of fuel consumption; (3) providing sufficient power and torque under light loading; or (4) avoiding build-up of soot particles, carbon deposits and dirt from fuel.

The present invention creates a more powerful engine by allowing the air-fuel mixture to swirl in the combustion chamber, which increases the engine horsepower without physically increasing the engine size. Engine horsepower is increased by burning more air and fuel in the compression cycle. Thus, the present invention solves the problem of poor fuel atomization of other inventions by mixing the air/fuel mixture into two planes in a swirling motion at subsonic speed. The present invention also solves these EGR problems by reburning the air fuel mixture over again. In addition, the present invention makes an engine more powerful without increasing its physical size. Furthermore, the present invention allows a small engine to be both efficient and capable of great power on demand by providing a variable compression ratio (VCR) where the inlet pressure is variable and the compression ratio is adjusted to suit. This VCR adjusts the compression ratio of an internal combustion engine to increase fuel efficiency while under varying loads and to allow the volume above the piston at top dead center to be changed. Moreover, the present invention comprises a structure with ramps that allows the fuel-air mixture to swirl when it is pulled in with a vacuum before the air-fuel mixture is compressed and detonated.

In the present invention, at least one engine cylinder (hereinafter, the "cylinder") in the internal combustion engine (hereinafter, the "engine") comprises a combustion chamber in the top, and a piston in the bottom. The combustion chamber further comprises at least one intake valve, at least one exhaust valve, and at least one spark-plug. The piston further comprises an internal combustor ring collider structure (hereinafter, the "combustor ring") that can be adjusted in both circumference and diameter to increase the cylinder volume. The top of the piston, which is commonly referred to as the piston crown or the piston head, contains an opening in the center of the piston crown, which is referred to herein as the vertically inverted intake cone, that forms an entry point into at least one converging nozzle (hereinafter, the "horizontal intake nozzle").

When the air-fuel mixture enters the larger cross-sectional area of the vertically inverted intake cone, it increases in velocity as it travels downwards to the smaller cross-sectional area of the vertically inverted intake cone in accordance with Bernoulli's Principle, which states an increase in the speed of a fluid occurs simultaneously with a decrease in pressure. The air-fuel mixture initially travels vertically downward through the vertically inverted intake cone, until it is directed radially in a horizontal plane from the output of the vertically inverted intake cone towards the outer circumference of the piston by passing through at least one horizontal intake nozzle. The horizontal intake nozzles are also converging nozzles, which have a larger diameter at their intake at the center of the piston and a smaller diameter at their output near the outer circumference of the piston. Thus, the air-fuel mixture increases in velocity as it travels from the larger diameter of the horizontal intake nozzle towards the smaller cross-sectional area of the horizontal intake nozzle in accordance with Bernoulli's Principle. The air-fuel mixture travels radially from the center of the piston to the exit points at the outer edge of the piston. In this configuration, the air-fuel mixture, which enters the converging nozzle and travels downwards to the center of the piston, is directed radially in a horizontal plane from the inlet of at least one horizontal intake nozzle to its exit.

When the air-fuel mixture exits at least one horizontal intake nozzle, it enters the combustor ring where it is directed radially in a counter-clockwise motion in a horizontal plane until it is directed upwards through at least one angled opening between the combustor ring and the inner bottom wall of the combustion chamber (hereinafter, a "ramp"), which allows the air-fuel mixture to swirl in a counter-clockwise motion in the combustion chamber as it spirals upwards from the bottom to the top of the combustion chamber in a cyclone-like motion. When the air/fuel mixture passes through the ramps it is atomized as it is broken into small uniform droplets when it enters the combustion chamber. This swirling pressurizes the exhaust stroke, which forcing more exhaust gases out of the combustion chamber and produces a low pressure area or vacuum, so that when the intake valve opens, the vacuum pulls a larger fuel charge into the engine on the intake stroke. This swirling effect causes a cyclone inside the combustion chamber that when ignited results in an additional explosive force that drives the piston downwards with additional acceleration, thereby increasing the power produced by the engine.

BRIEF DESCRIPTION OF THE DRAWINGS

The accompanying drawings, which are incorporated in and constitute a part of this specification, illustrate several aspects described below.

DETAILED DESCRIPTION OF THE INVENTION

It is a principal object to solve at least one of the disadvantages with other attempted solutions or to create other utility by overcoming the dimensional constraints of a combustion chamber to increase the power that can be obtained from an engine.

The present invention allows the air-fuel mixture to swirl in the combustion chamber to increase the power from the engine. Similar to a traditional engine, each cylinder contains a piston in the bottom and a combustion chamber in the top. Also, the combustion chamber comprises at least one intake valve, at least one exhaust valve, and at least one spark-plug.

Intake Cycle

Figure 1:
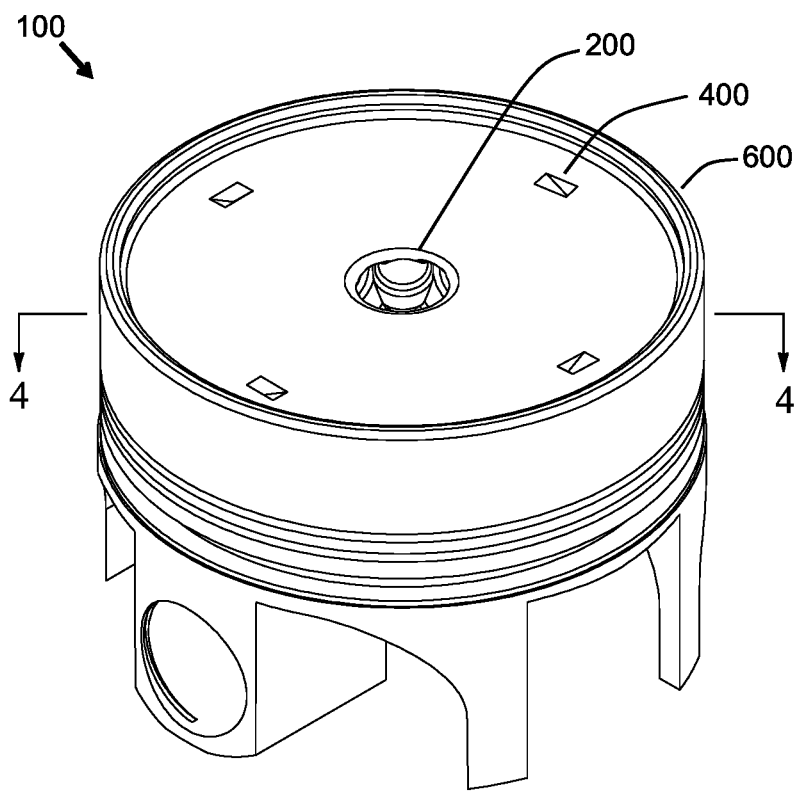
FIG. 1 is an isometric top view of the piston of the device of the present invention in which at least one of the embodiments of the present invention is shown.

FIG. 1 is an isometric top view of the piston 100 of the device of the present invention. Unlike typical internal combustion engines, the top center of the piston 100 in the present invention contains a hole in the shape of a vertically inverted intake cone 200. This hole or vertically inverted intake cone 200 forms an entry point to a converging nozzle. The air/fuel mixture travels from the center of the piston 100 vertically through the inverted intake cone 200 and then radially in a horizontal direction through at least one horizontal intake nozzle 300 (see FIGS. 3-4) to its outer circumference into the combustor ring 500 (see FIGS. 3-4) to form a low pressure zone or eye of the cyclone.

Figure 2:
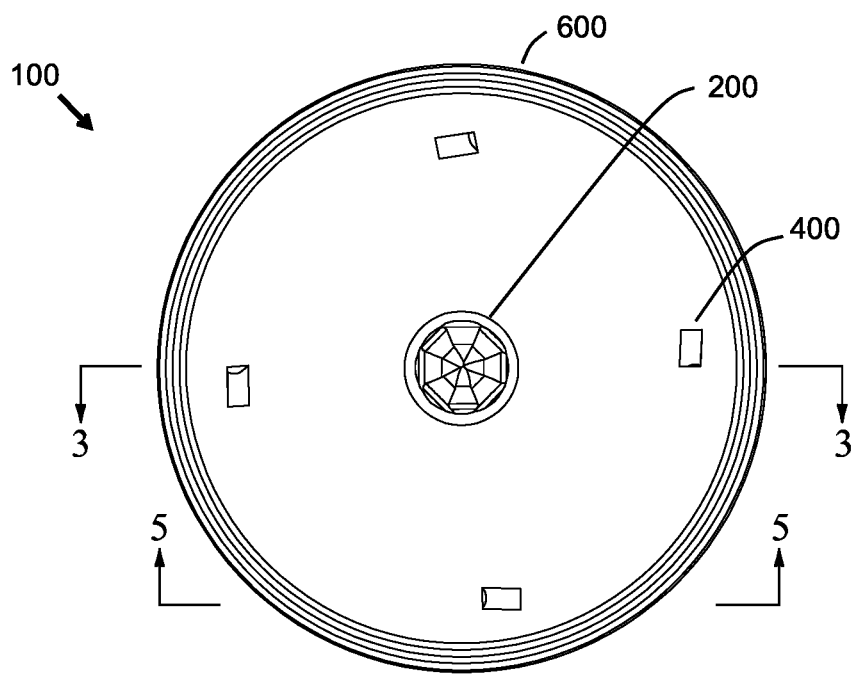
FIG. 2 is a top view of the piston of the device of the present invention in which at least one of the embodiments of the present invention is shown.

FIG. 2 is a top view of the piston of the device of the present invention. As shown in FIG. 2, an air-fuel mixture enters the larger cross-sectional area of the vertically inverted intake cone 200 at the top center of the piston 100 and increases in velocity as it travels downwards to the smallest cross-sectional area of the converging nozzle in the interior of the piston 100.

In other words, the air-fuel mixture is pulled by a vacuum into the combustion chamber towards piston 100 to the center of intake cone 200 that forms an entry to a converging nozzle. The air-fuel mixture moves into the horizontal intake nozzles 300 where the air-fuel moves through and exits into the combustor ring 500. It is then directed up ramps 400, which direct the air-fuel mixture to the surface of the piston crown 600.

Figure 3:
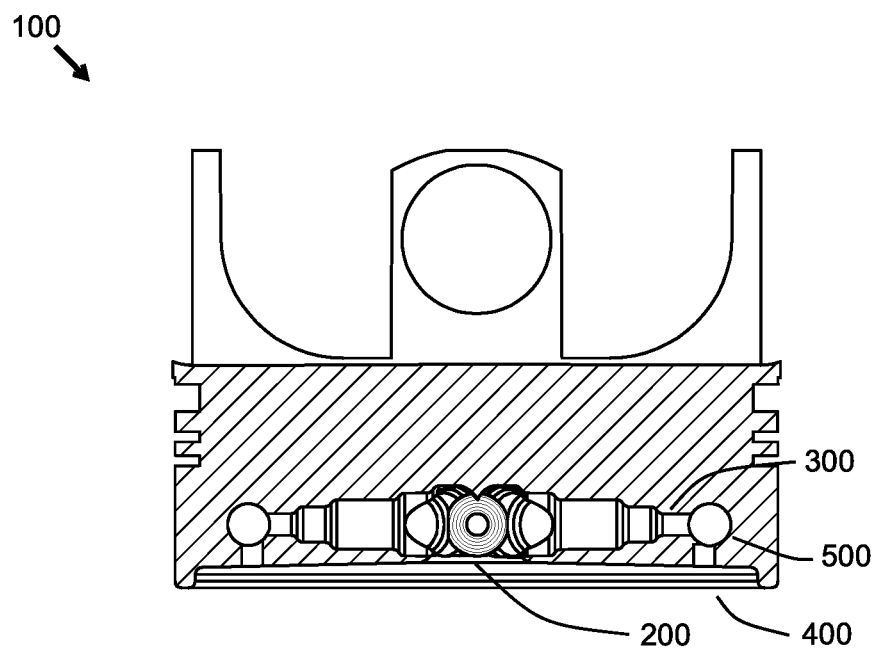
FIG. 3 is a side cut-away view of the piston of the device of the present invention in which at least one of the embodiments of the present invention is shown.

FIG. 3 is a side cut-away view of the piston of the device of the present invention. After the air-fuel mixture enters the center of the interior of the piston 100 through the vertically inverted intake cone 200, it is directed radially in a horizontal direction outwards from the center of the piston 100 towards the outer circumference of the piston. In doing so, the air-fuel mixture again travels through at least one converging horizontal intake nozzle 300. The horizontal intake nozzles 300 are arranged radially with their entry points at the center of the piston 100 near the exit point of the converging vertically inverted intake cone 200. The exit points of the converging vertically inverted intake cones 200 are at the outer edges of the piston 100 near its outer circumference into a combustor ring 500.

Figure 4:
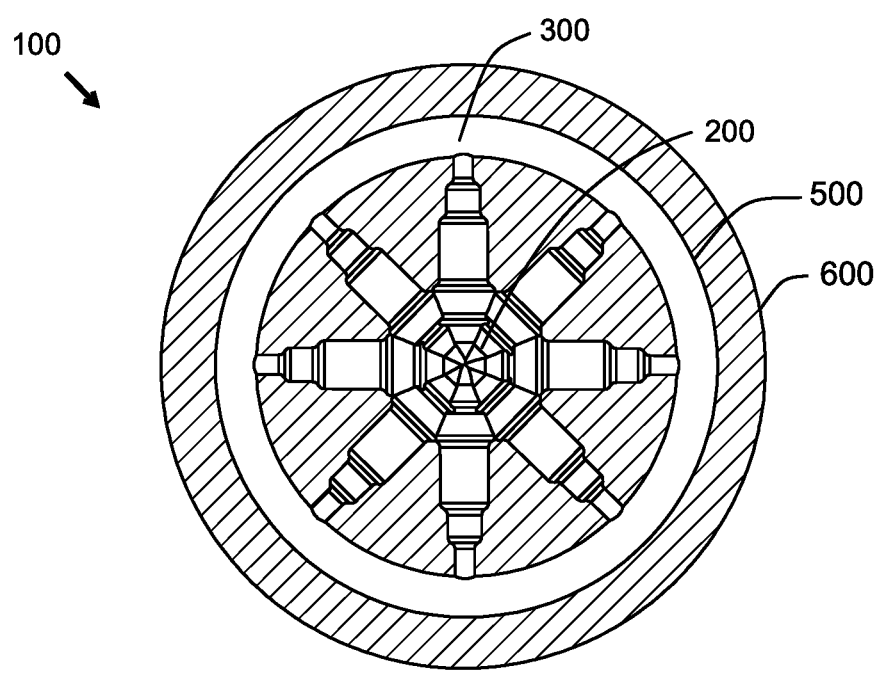
FIG. 4 is a top cut-away view of the piston of the device of the present invention in which at least one of the embodiments of the present invention is shown.

FIG. 4 is a top cut-away view of the piston of the device of the present invention. FIG. 4 shows where the air-fuel mixture travels radially in a horizontal direction from the exit of the vertically inverted intake cone 200 at the center of the piston 100 into the entry point of at least one horizontal intake nozzle 300 to the exit of the horizontal intake nozzle 300. Thus, the air-fuel mixture first travels vertically downwards through the vertically inverted intake cone 200 into the center interior of the piston 100. Second, the air/fuel mixture travels radially in a horizontal direction through at least one horizontal intake nozzle 300 from the center of the piston 100 to its outer circumference into the combustor ring 500 to form a low pressure zone or eye of the cyclone.

Thus, as seen in FIG. 3-4, the inside of the piston 100 comprises at least one horizontal intake nozzle 300 radiating from the center of the piston 100 to the outer circumference of the piston 100. With this configuration, the air-fuel mixture enters the top of the piston 100 head through a vertically inverted intake cone 200 and travels downwards from the top of the piston 100 head and then radially in a horizontal direction through at least one horizontal intake nozzle 300. The horizontal intake nozzles 300 are arranged radially inside of the piston 100 head parallel to the top surface of the piston 100 head. Thus, the horizontal intake nozzles 300 are perpendicular to the vertical motion of the piston 100 head.

In other words, eight horizontal intake nozzles 300 are arranged radially inside the piston 100 head. The inlet portions of the horizontal intake nozzles 300 are at the vertex of the vertically inverted cone that is formed by the converging cylinder inside of the piston 100 head. The outlet of the converging nozzle connects to the inputs of the horizontal intake nozzles within the piston 100. The exits of the horizontal intake nozzles at the outer circumference of the piston 100 allows the air-fuel mixture to be directed onto ramps 400 which divert the flow and cause the swirling effect within the combustion chamber. To accomplish this, the exit points for the horizontal intake nozzles are arranged near the outer circumference of the piston 100, which is referred to as the combustor ring 500. The piston crown 600 is lined with ramps 400 that direct the air-fuel mixture up the ramps 400 toward the surface of the piston crown 600.

Figure 5:
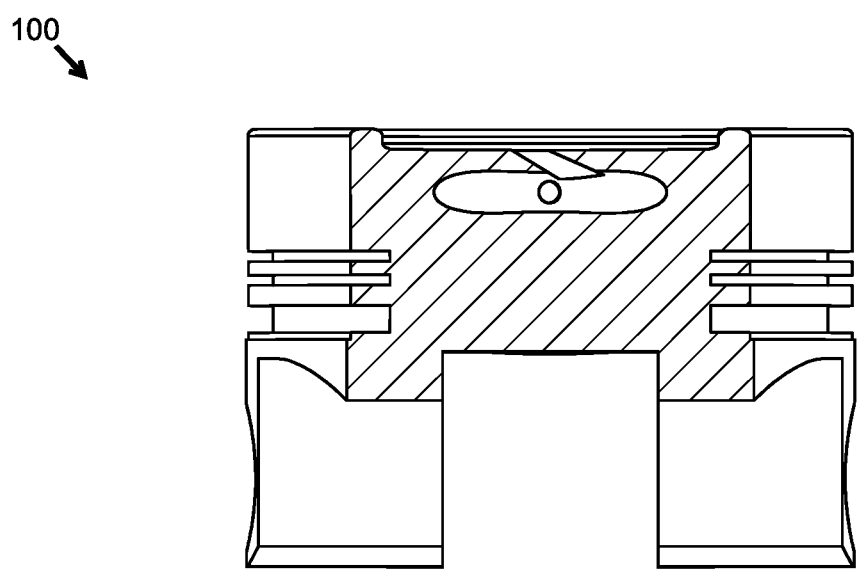
FIG. 5 is a side cut-away view of the piston focusing on the ramp of the device of the present invention in which at least one of the embodiments of the present invention is shown.

FIG. 5 is a side cut-away view of the piston focusing on the ramps of the device of the present invention.

Figure 6:
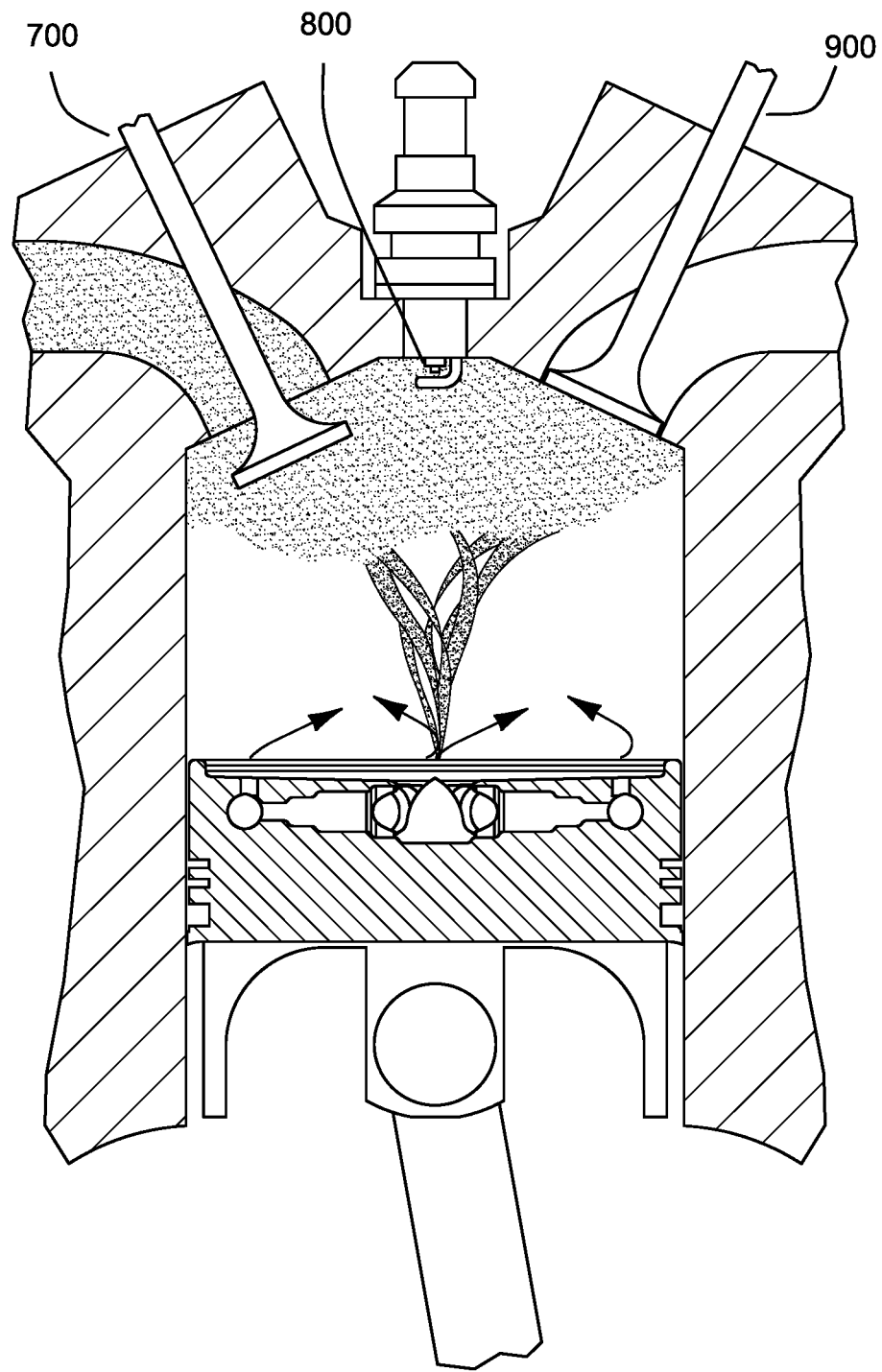
FIG. 6 is a side cut-away view of the piston within a combustion chamber with the intake port open and the piston head in a low position of the device of the present invention in which at least one of the embodiments of the present invention is shown.

FIG. 6 is a side cut-away view of the piston within a combustion chamber with the intake port open and the piston head in a low position. As the air/fuel mixture travels up the ramps 400 it atomizes meaning that it breaks any fuel into very fine droplets to create a uniform air/fuel mixture as it enters into the combustion chamber. The swirling effect of the uniform air/fuel mixture in the combustion chamber causes a cyclone that pressurizes the air/fuel mixture inside the combustion chamber, which forces more exhaust gas out of the combustion chamber after the air/fuel mixture ignites. Forcing more exhaust gas out of the combustion chamber also allows more air/fuel mixture to be pulled into the combustion chamber as the intake valve opens. This swirling effect produces more power, since the swirling air/fuel mixture is at a higher pressure and combustion temperature, which produces more horsepower and efficiency.

Compression Cycle

Figure 7:
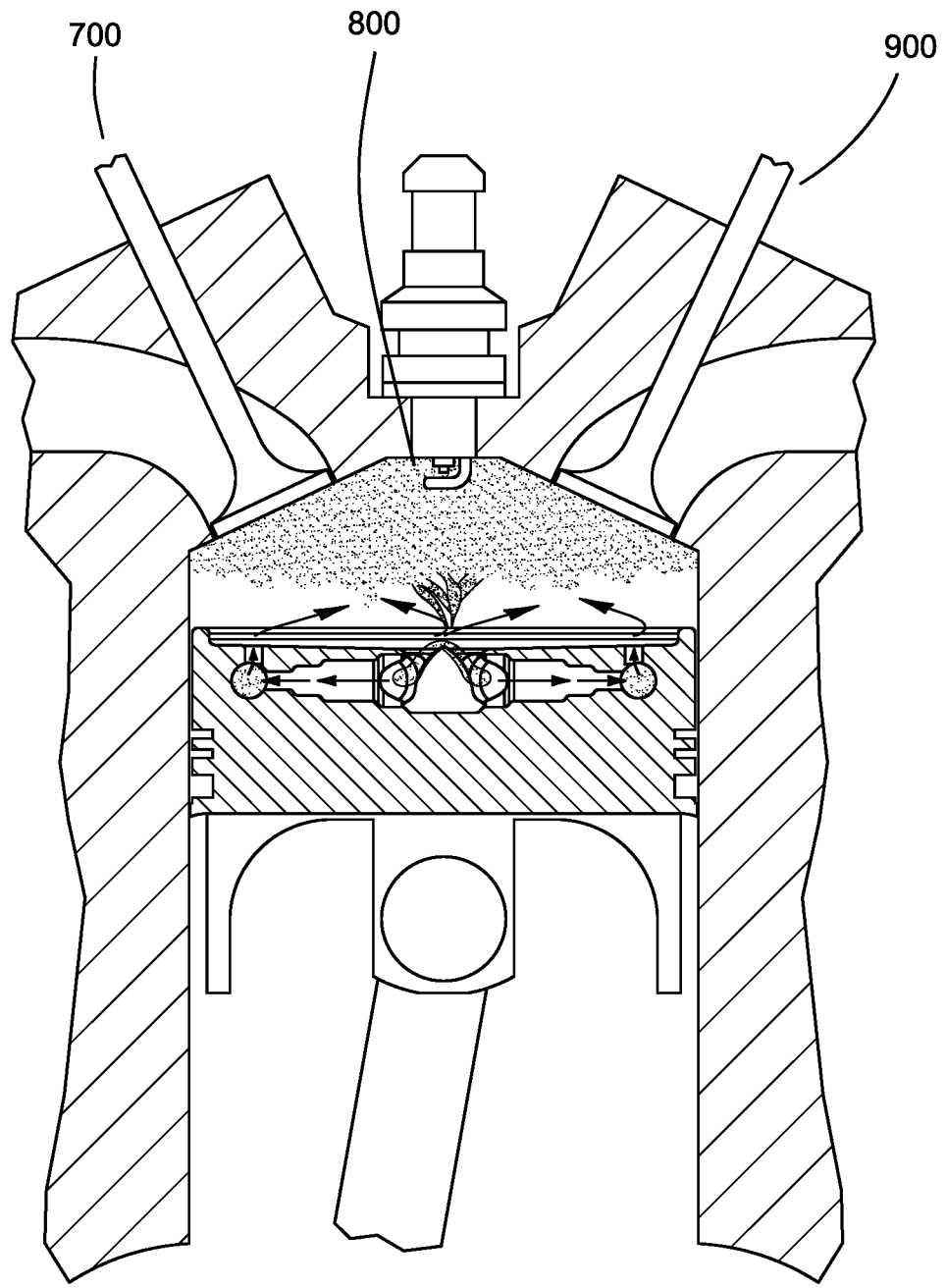
FIG. 7 is a side cut-away view of the piston within a combustion chamber with the piston head in a high position of the device of the present invention in which at least one of the embodiments of the present invention is shown.

FIG. 7 is a side cut-away view of the piston within a combustion chamber with the piston head in a high position. As the piston 100 moves up to the "Top Dead Center" position, the air/fuel mixture moves through the converging nozzle and increases in speed. As the air/fuel mixture exits the converging nozzle, the air/fuel mixture enters the horizontal intake nozzles 300 where it is compressed more as it gains speed. As the air/fuel mixture exits the horizontal intake nozzles 300, it enters the combustor ring 500, where the air/fuel mixture pressurized the ring 500. Also, as the air/fuel mixture enters the ring, it hits the outer wall atomizing the air/fuel mixture. As the pressure builds, the air/fuel mixture moves up the ramps 400 built into the inter walls of the ring. Once the air/fuel mixture reaches the top of the ramps 400, it enters the surface of the piston crown 600. The ramps 400 guide the air/fuel mixture to form a cyclone on the surface of the crown 600.

As shown in FIG. 7, the compression cycle occurs when the air-fuel mixture exits the air intake nozzles 300, and enters the combustor ring 500 where it begins to pressurize the combustor ring 500 to a certain pressure level as the air-fuel mixture spins around inside the combustor ring 500. Also, the air-fuel mixture moves up the ramps 400 located on the inner walls of the combustor ring 500. The air-fuel exits the top of the ramps 400, which are angled so that the air-fuel hits the curvature of the piston and cylinder to form a 360 degree cyclone on the surface of piston crown 600, where a low pressure zone or eye forms in the center of the inverted cone 200. As the piston 100 rises up the combustion chamber, the air-fuel mixture is compressed vertically. As this occurs, the air-fuel mixture rotates in a counterclockwise rotation within the combustor ring 500 as it moves at subsonic speed. As the air-fuel moves up the ramps 400, it atomizes as it hit the ramps 400. As the air-fuel mixture exits the ramps 400, it forms a 360 degree cyclone that speeds up as it is compressed, which in turn speeds up the counterclockwise rotation of the air-fuel mixture in the combustor ring 500. This results in a stronger low pressure zone in the vertically inverted cone 200, which in turn creates a stronger high pressure zone or cyclone. In other words, as the pressure builds up in combustor ring 500, the rotating motion draws in more air-fuel mixture from the air intake nozzle 300, which then increases the velocity up the ramps 400, which creates a stronger cyclone.

Power Cycle

Figure 8:
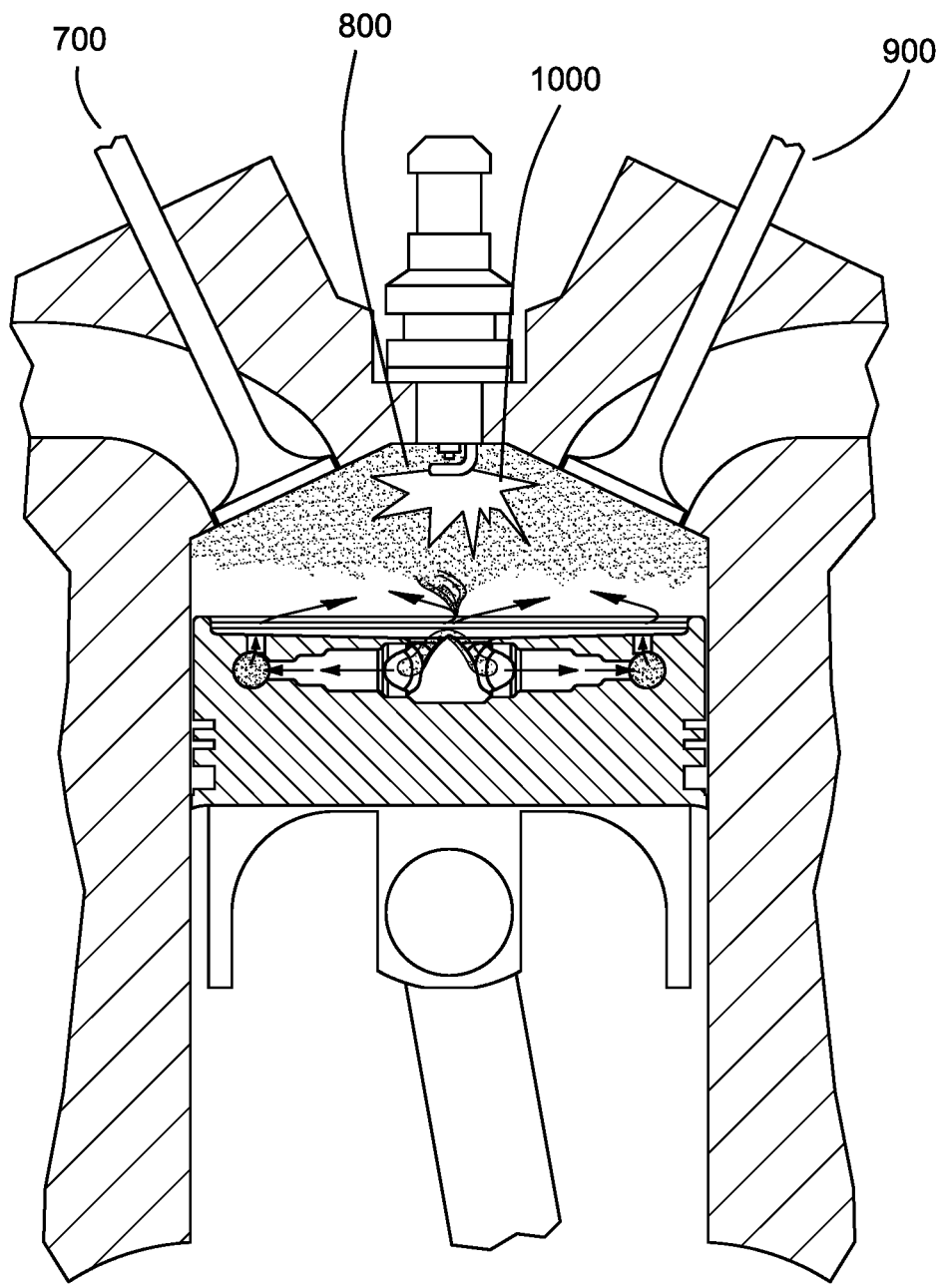
FIG. 8 is a side cut-away view of the piston within a combustion chamber with the piston head in a high position at the point of explosion of the device of the present invention in which at least one of the embodiments of the present invention is shown.

FIG. 8 is a side cut-away view of the piston within a combustion chamber with the piston head in a high position at the point of explosion. Once the piston 100 reaches its "Top Dead Center" position, the cyclone is compressed down to bilateral combustion with a low pressure zone in the middle. Once the spark plug fires, it develops a swirling flame front moving down pushing the piston 100. At the same time, there is a second event when the flame front moves through the converging nozzle, horizontal intake nozzles 300, combustor ring 500, and the ramps 400, which direct the air-fuel mixture to the surface of the piston crown, where it develops a subsonic speed to mach. This cyclone wave, which can absorb the detonation shockwave, uses its force to push down harder on the piston 100. Thus, there are two combustion processes happening at once to develop more power in the cycle.

Thus, the device comprises a converging nozzle that forms the vertically inverted intake cone 200 in the piston 100 that directs the air-fuel mixture to the horizontal intake nozzles, which directs the air-fuel mixture through a combustor ring 500 and up the ramps 400 to the surface of the piston crown 600, which causes the counterclockwise swirling effect of the air-fuel mixture within the combustion chamber. This swirling effect causes a cyclone inside the combustion chamber that is ignited by the spark plug 800, which causes an explosion 1000 with a more explosive force.

In other words, as the piston 100 reach its Top Dead Center position, the cyclone will compress into bilateral cyclone combustion. When the spark plug fires, the cyclone will ignite and the resulting swirling cyclone will force the piston 100 downwards. The cyclone air-fuel mixture that is burning is being recycled while being pulled back in though the inverted cone 200, similar to an EGR valve in a piston.

Exhaust

Figure 9:
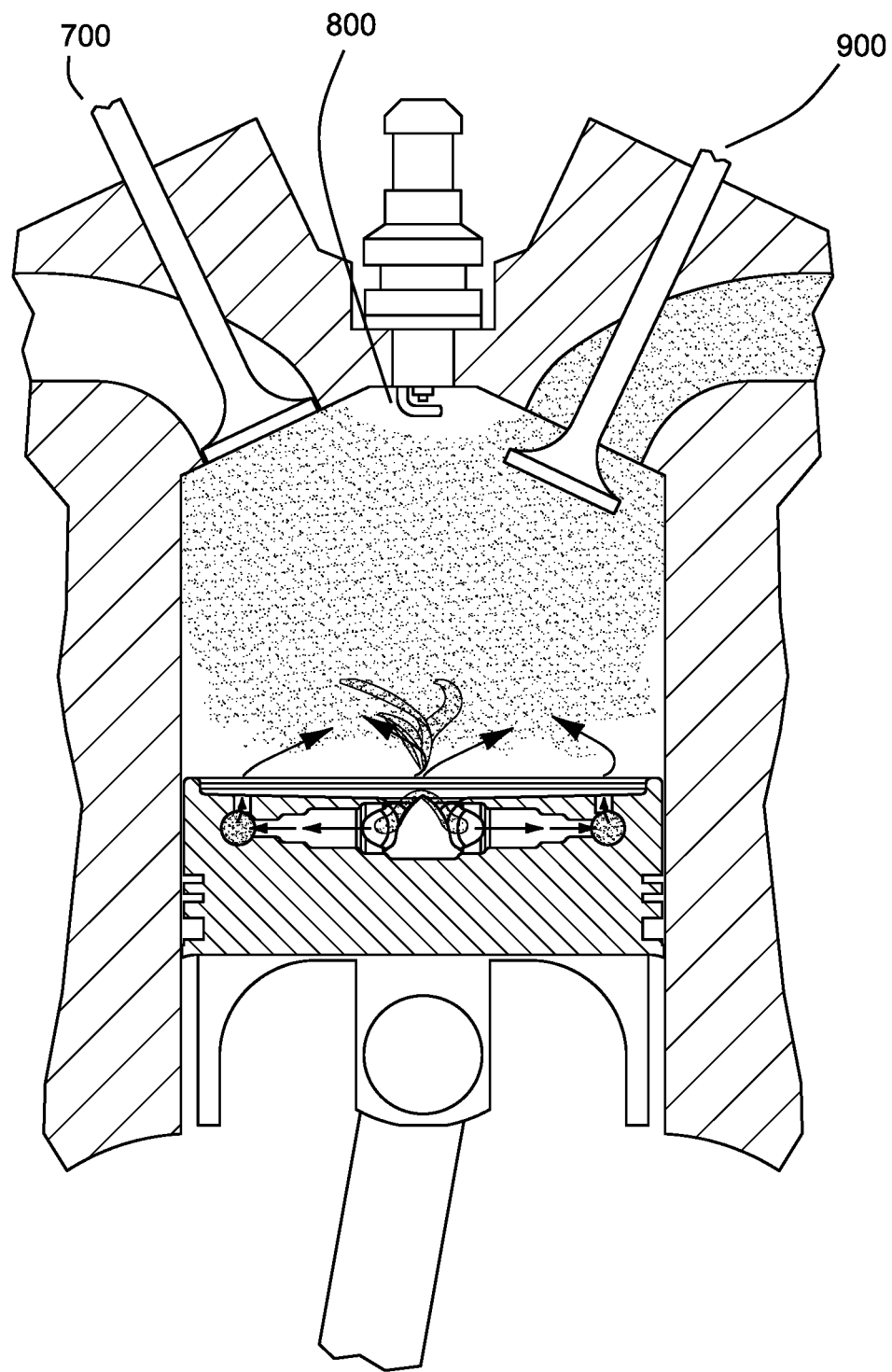
FIG. 9 is a side cut-away view of the piston within a combustion chamber with the exhaust port open and the piston head in a low position of the device of the present invention in which at least one of the embodiments of the present invention is shown.

FIG. 9 is a side cut-away view of the piston within a combustion chamber with the exhaust valve 900 open and the piston 100 in a low position. When exhaust valve 900 opens, exhaust valve 700 closes, and all of the hot gases are let out and the cyclone forms again starting the cycle over. As shown in FIG. 9, when the spark plug 800 causes an explosion 1000 with a more explosive force, this force drives the piston 100 downwards with a faster acceleration, thereby increasing the power produced by the engine.

Figure 10:
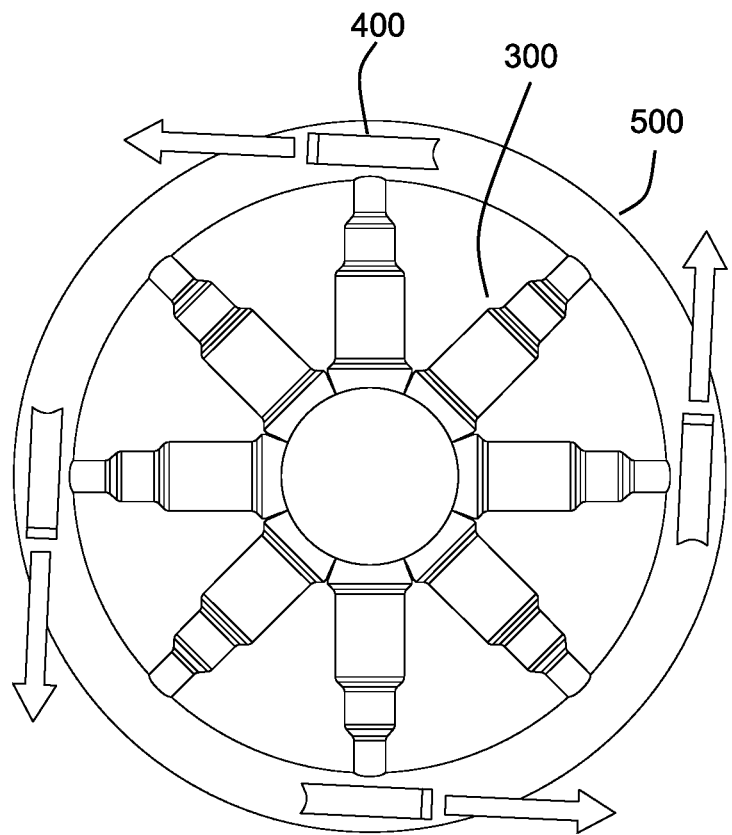
FIG. 10 is a top cut-away view of the piston of the device of the present invention showing the air-fuel mixture flowing out of the ramps, which direct the air-fuel mixture to the surface of the piston crown, in which at least one of the embodiments of the present invention is shown.

FIG. 10 is a top cut-away view of the piston of the device of the present invention showing the air-fuel mixture flowing out of the ramps, which direct the air-fuel mixture to the surface of the piston crown.

Figure 11:
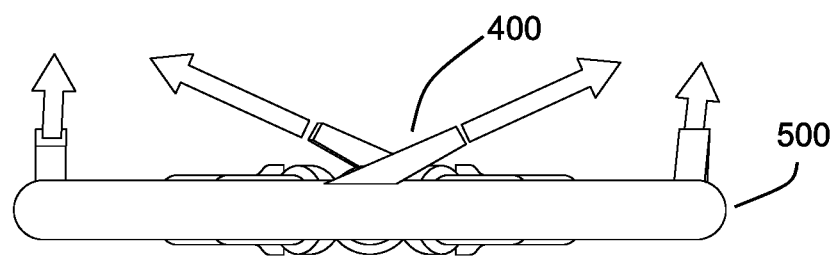
FIG. 11 is a side cut-away view of the piston of the device of the present invention showing the air-fuel mixture flowing out of the ramps, which direct the air-fuel mixture to the surface of the piston crown, in which at least one of the embodiments of the present invention is shown.

FIG. 11 is a side cut-away view of the piston of the device of the present invention showing the air-fuel mixture flowing out of the ramps, which direct the air-fuel mixture to the surface of the piston crown.

By increasing the size or number of the horizontal intake nozzles 300 and the combustor ring 500, the horsepower of the engine is increased, without physically increasing the size of any piston 100 or the engine. Because compression inside the piston 100 is greater than outside the piston 100, there are two compression zones in each cylinder. The invention combines the vertically inverted intake cone 200, horizontal intake nozzles 300, combustor ring 500, and ramps 400 to allow more air fuel mixture to be processed within the engine cylinder bore. This is an improvement over a regular engine, which has a limited amount of air-fuel mixture. Thus, the present invention creates low pressure vacuum at the inverted intake cone 200, which pulls in more air-fuel mixture that fills the horizontal intake nozzles 300, combustor ring 500, and ramps 400. By spinning and compressing the air-fuel mixture, the air-fuel mixture is atomized, and a boundary layer is created that forms a cyclone within the cylinder on the piston crown 600 from the horizontal rotational flow in the combustor ring 500, the angled flow of the air-fuel mixture up the ramps 400, and the inner interior wall of the cylinder. The air-fuel mixture continues to rotate in a cyclone, which keeps the air-fuel mixture pre-igniting allowing more air-fuel mixture to create more power. In other words, the invention creates an engine within an engine, since piston 100 allows for an intake of an air-fuel mixture through the inverted intake cone 200, where the air-fuel mixture is compressed in the horizontal intake nozzles 300 allowing it to gain speed as it enters the combustor ring 500 where it undergoes a horizontal rotation until it exits through the angled ramps 400, which cause the exiting flow to be part vertical and part horizontal, until it is directed into a rotation by the inner walls of the cylinder that causes the cyclone rotation that creates its own thrust.

Although the invention has been explained in relation to its preferred embodiment, it is to be understood that many other possible modifications and variations may be made without departing from the spirit and scope of the invention. All illustrations of the drawings are for the purpose of describing selected versions of the present invention and are not intended to limit the scope of the present invention.

What is claimed is:

1. An internal combustion engine, comprising:
   at least one engine cylinder; comprising:
   a. a combustion chamber, comprising:
   1. at least one intake valve;
   2. at least one exhaust valve; and
   3. at least one spark-plug;
   b. a piston, comprising:
   1. a piston crown;

2. a vertically inverted intake cone located under the piston crown forming a converging nozzle in the center of the piston crown;
3. at least one horizontal intake nozzles located under the piston crown;
4. a combustor ring located under the piston crown; and
5. at least one ramp located under the piston crown that is angled to allow the air-fuel mixture to curve with the cylinder to form a 360 degree cyclone on the piston crown.

2. The vertically inverted intake cone of claim 1, further comprising an entry point to a converging nozzle that allows an air/fuel mixture to travel from the center of the piston.

3. The piston of claim 1, further comprising a passage to allow the air/fuel mixture to travel radially in a horizontal direction through the at least one horizontal intake nozzle.

4. The piston of claim 1, further comprising a passage to allow the air/fuel mixture to travel to the outer circumference into the combustor ring.

5. The piston of claim 1, further comprising a passage to allow the air/fuel mixture to travel radially to the outer circumference into the combustor ring through at least one converging horizontal intake nozzle.

6. The combustor ring of claim 1, further comprising a passage to allow the air/fuel mixture to travel up ramps.

7. The ramps of claim 1, further comprising a passage to allow the air/fuel mixture to travel into the combustion chamber.

\* \* \* \* \*